Jan. 29, 1957  D. R. DE BOISBLANC  2,779,917
APPARATUS FOR DETERMINING THE CONDITION OF IONIZED FLUIDS
Filed April 14, 1952
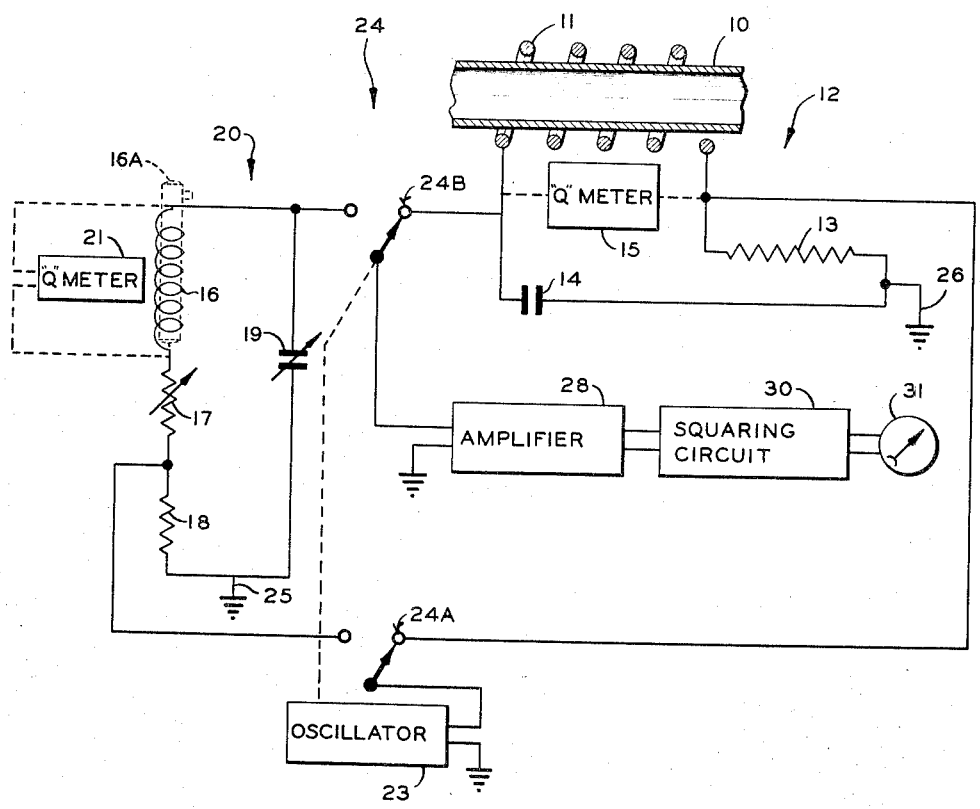
INVENTOR.
D. R. DE BOISBLANC
BY
Hudson & Young
ATTORNEYS

United States Patent Office 2,779,917
Patented Jan. 29, 1957

2,779,917

APPARATUS FOR DETERMINING THE CONDITION OF IONIZED FLUIDS

Deslonde R. de Boisblanc, Idaho Falls, Idaho, assignor to Phillips Petroleum Company, a corporation of Delaware Application April 14, 1952, Serial No. 282,094

12 Claims. (Cl. 324—40)

This invention relates to apparatus for determining the condition of ionized fluids. In another aspect, it relates to apparatus for measuring the temperature of ionized fluids.

When a coil of wire is immersed in a medium containing free ions or electrons, such as an electrolyte or thermally ionized gas, the movement of the ions induces voltages in the coil. Where such motion is caused by the Brownian agitation, which is a function of temperature, the voltages are of a random nature and the energy contained in any portion of the frequency spectrum is simply related to the absolute temperature. Viewed from the terminals of the coil, this voltage is indistinguishable from thermal noise which would arise if the coil had a series resistance. The noise power appearing at the coil terminals is:

$$\overline{E^2} = a^2 (4RkTdf) \qquad (1)$$

where R is the value of the series resistance, $k$ is Boltzmann's constant, T is the absolute temperature, $df$ is the interval of frequency over which measurements are made, and $\overline{E^2}$ is the time average of the voltage squared, also referred to as the quadratic content of E. The quantity $a^2$ is a function of the external circuit connected across the coil. For example, if the external circuit is a tuned circuit including a condenser connected in parallel with the coil and the observation is made at the resonant frequency:

$$a = Q = \frac{2\pi fL}{R} \qquad (2)$$

If the coil is placed in a conducting medium, at any frequency, the coil exhibits a resistance indistinguishable from the simple series resistance mentioned above. Furthermore, from the standpoint of a thermal noise generator, the equivalent noise temperature is that of the medium, not that of the coil. It will be understood that the effect of ambient temperature on the noise output of the coil is masked while the ionized fluit is at a substantially higher temperature than ambient temperature. If the effect of ambient temperature is not so masked, it can be readily compensated for, as those skilled in the art will understand. The effect of excitation of the coil is to cause it to indicate a higher temperature than the correct value, but since the energies in such transitions are predominantly electrostatic, the coefficient of coupling with the coil is very small compared to that of the thermally moving ions.

In carrying out the invention, an inductance coil is wrapped around a vessel in which the ionized fluid is contained. Suitable components are associated with this coil as to provide a tuned circuit. The output of the coil is a function of the velocity of ion movement and, hence, of the temperature of the fluid. After suitable calibration, the quadratic output of the coil directly indicates the temperature. In another embodiment, a second tuned circuit is provided, the "Q" of which can be varied, for example, by adjustment of a resistance connected in series with the coil. The noise power appearing in the coil terminals of the second coil is as follows:

$$\overline{E^2} = a^{2\prime} (r'R'k'T'df') \qquad (3)$$

where the symbols are as identified in connection with Equation 1, except that T' is the temperature of the second coil itself.

In accordance with the invention, under the operating conditions, the "Q" of the second circuit is so adjusted as to equal the "Q" of the circuit including the coil surrounding the gas-containing vessel. As a result, the factors "$a$" in the two equations become equal and the following relationship exists between the electrical noise powers appearing at the terminals of the respective coils.

$$\frac{e_1^2}{e_2^2} = \frac{T_1}{T_2} \qquad (4)$$

By incorporating a circuit whose output is the square of the input voltage, the circuit can be calibrated so that the temperature of the ionized fluid is directly determined.

It is an object of the invention to provide improved apparatus for indicating the condition of ionized fluids.

It is a further object to provide an improved circuit for determining the temperature of ionized fluids.

Various other objects, advantages and features of the invention will become apparent from the following detailed description taken in conjunction with the accompanying drawing, in which the figure is a schematic circuit diagram illustrating a preferred application of the invention.

Referring now to the drawing, I have shown a container 10 encircled by an inductance coil 11, the container holding an ionized gas, the temperature of which is to be determined. In some variations of the invention, the container 10 can define a zone in which flame is periodically present.

The coil 11 is connected in a tuned circuit 12 including a fixed resistance 13 of small ohmic value connected in series with the coil and a condenser 14 connected in parallel with the coil-resistance combination. The "Q" of the circuit can be measured by a meter 15 which is shown as being connected across the coil terminals. A suitable meter of this type is shown in an article entitled "The Measurement of 'Q'," Electronic Engineering, April 1943, pages 452 ff.

A reference tuned circuit is constituted by a coil 16 which has connected in series therewith, an adjustable resistance 17 and a fixed resistance 18, a condenser 19 being connected in parallel with the inductance-resistance combination. In some cases, coil 16 can encircle a container 16a containing ionized fluid at a reference temperature. Preferably and advantageously, the components of the second tuned circuit, which is designated by reference numeral 20, are of generally the same magnitude as those of the tuned circuit 12. That is to say, coil 16 has substantially the same inductance as the coil 11, condenser 19 has substantially the same capacitance as condenser 14, and resistance 18 has substantially the same ohmic value as resistance 13. A "Q" meter 21 is connected across the terminals of the coil 16 and it will be understood that separate meters can be utilized or, alternatively, only one meter need be used, a suitable switching arrangement being provided to connect it alternately to the coils 11 and 16.

An oscillatory voltage is selectively applied to the tuned circuits 12, 20 by an oscillator 23. To this end, one output terminal of the oscillator is grounded and the other output terminal is connected through one gang 24a of a two gang, two position switch 24. The fixed terminals of switch gang 24a are connected, respectively, to the junction between coil 11 and fixed resistance 13, and to the junction between resistances 17, 18. In this manner, the output of the oscillator appears across one of the fixed resistances 13 or 18, as determined by the setting of switch 24, the circuit being completed through ground connection 25 or 26.

The circuit also includes an amplifier 28, one terminal of the input circuit thereof being grounded and the other terminal being connected through the second gang 24b of switch 24 either to condenser 14 of tuned circuit 12 or condenser 19 of tuned circuit 20. In either case, the return circuit is completed through ground connection 25 or 26 so that the input circuit of the amplifier is connected in parallel with condenser 14 or 19 depending upon the setting of the switch.

The output of amplifier 28 is fed to a squaring circuit 30, the output voltage of which varies as the square of the input voltage, as shown in the copending application of D. R. de Boisblanc and R. S. Marsden, Serial No. 220,115, entitled Thermal Noise Thermometer, filed April 9, 1951, now abandoned. The output voltage of squaring circuit can be read by a meter 31.

In the operation of the circuit, container 10 has a fluid therein, preferably a gas, whose temperature is to be measured. Adjustments of variable resistor 17 and condenser 19 are made until the "Q" of circuit 20 is equal to the "Q" of tuned circuit 12, as noted by observation of the meters 15, 21. With the circuits in this condition, the temperature of the fluid in container 10 and the ambient temperature of the tuned circuit 20 is proportional to the squares of the voltages appearing at the terminals of switch gang 24b. The ambient temperature of circuit 20 can be readily calcuated or, alternatively, it is within the scope of the invention to provide a second vessel 16a encircled by the coil 16 containing a reference ionized fluid at a known temperature. Thereupon, readings are taken of meter 31 with the switch 24 in both positions whereupon the temperature of the ionized fluid within container 10 can be calculated readily from the relationship:

$$\frac{e_1^2}{e_2^2} = \frac{T_1}{T_2}$$

In a broader aspect of the invention, the tuned circuit 20 can be eliminated, the meter 31 being calibrated by successively passing gas streams of the fluid whose temperature is to be determined at a known flow rate and at different temperatures through the vessel 10. After such calibration, the temperature of subsequent gas streams can be read directly from the meter 31.

Since ionized particles are present in flame zones, it will be evident that the apparatus can also be used to determine the temperature or condition of a flame zone which may be continuously or intermittently present within the vessel 10. It will be evident, therefore, that I have achieved the objects of my invention in providing an improved circuit for determining the conditions of an ionized body of fluid and, in particular, in measuring the temperature thereof.

The output of the coil 11 and its associated tuned circuit is affected by the ambient temperature of the coil. However, the resistance of the coil can be made sufficiently low so that the voltages arising from this source are substantially less than 5 percent of the total voltage developed by the circuit. Further, if the ambient temperature fluctuations are not severe, they can be compensated for by calibration so that the final measurement has an accuracy of better than 1 percent. In some applications, the temperature of coil 11 is regulated by operating at slightly above the temperature of the fluid or by water cooling the coil.

The linear movement of the molecules in the gas flowing through vessel of pipe 10 also creates a signal which appears at the output of the resonant circuit. The voltage from this source is small compared to the voltage representative of temperature and it decreases with increasing frequency. At frequencies above 100 kilocycles per second, the magnitude of the signal resulting from linear motion of the gas molecules is vanishingly small.

While the invention has been described in connection with a present, preferred embodiment thereof, it is to be understood that this description is illustrative only and is not intended to limit the invention.

I claim:

1. In apparatus of the character described, a tuned circuit including an inductance coil, and a container encircled by said coil, an ionized fluid in said container, an oscillator, a circuit for producing an output voltage which varies as the square of the input voltage, means indicating said output voltage, and means for coupling said oscillator and the input of said squaring circuit to said tuned circuit.

2. In apparatus of the character described, a tuned circuit including an inductance coil, and a container encircled by said coil, a second tuned circuit including an adjustable resistance for varying the "Q" of the tuned circuit, a unit including an oscillator, a unit including a circuit for producing an output voltage which varies as the square of the input voltage, and means indicating said output voltage, and means for selectively coupling both of said units to said tuned circuits.

3. In apparatus of the character described, an inductance coil, a container encircled by said coil, a condenser connected in parallel with said coil to form a tuned circuit, a second tuned circuit including a coil, an adjustable resistance connected in series therewith, and a condenser connected in parallel with the condenser-resistance combination, a unit including an oscillator, a unit including a circuit for producing an output voltage which varies as the square of the input voltage, and means indicating said output voltage, and means for selectively coupling both of said units to said tuned circuits.

4. In apparatus of the character described, an inductance coil, a container encircled by said coil, a fixed resistance connected in series with said coil, and a condenser connected in parallel with the coil-resistance unit, a second tuned circuit including a coil, an adjustable resistance and a fixed resistance connected in series therewith, and a condenser connected in parallel with the condenser-resistance combination, a unit including an oscillator, a unit including a circuit for producing an output voltage which varies as the square of the input voltage, and means indicating said output voltage, and means for selectively coupling both of said units to said tuned circuits.

5. In apparatus of the character described, an inductance coil, a container encircled by said coil, an ionized gas whose temperature is to be measured in said container, a fixed resistance connected in series with said coil, and a condenser connected in parallel with the coil-resistance unit, an oscillator, a circuit for producing an output voltage which varies as the square of the input voltage, means indicating said output voltage, leads connecting said oscillator across said fixed resistance, and leads connecting the input of said squaring circuit in parallel with said condenser.

6. In apparatus of the character described, an inductance coil, a container encircled by said coil, a fixed resistance connected in series with said coil, and a condenser connected in parallel with the coil-resistance unit, means for measuring the "Q" of said tuned circuit, a second tuned circuit including a coil, an adjustable resistance and a fixed resistance connected in series therewith, and a condenser connected in parallel with the condenser-resistance combination, means for measuring the "Q" of said tuned circuit, a unit including an oscillator, a unit including a circuit for producing an output voltage which varies as the square of the input voltage, and means indicating said output voltage, and means for selectively coupling both of said units to said tuned circuits.

7. In apparatus of the character described, a tuned circuit including an inductance coil, a container encircled by said coil, a fixed resistance connected in series with said coil, and a condenser connected in parallel with the coil-resistance unit, a second tuned circuit including a coil, an adjustable resistance and a fixed resistance connected in series therewith, and a condenser connected in parallel with the condenser-resistance combination, a two gang switch, an oscillator connectible through one gang of said switch so as to apply an oscillatory voltage across the fixed resistance of one tuned circuit with the switch in a first position and to apply said oscillatory voltage across the fixed resistance of the other tuned circuit with the switch in a second position, an amplifier having an input circuit and an output circuit, said input circuit being connectible through the other gang of said switch across the condenser of said one tuned circuit with the switch in said first position and being connected across the condenser of said other tuned circuit with the switch in said second position, a squaring circuit coupled to the output circuit of said amplifier, said squaring circuit producing an output voltage which varies as the square of the input voltage, and means indicating the output voltage of said squaring circuit.

8. In apparatus for measuring the temperature of a fluid, a container, an ionized fluid in said container, an inductance coil encircling said container, a tuned circuit including said coil as one element thereof, a second tuned circuit having an adjustable resistance for varying the "Q" of said circuits, means for supplying an oscillatory voltage to said circuits, a circuit for producing an output voltage which varies as the square of the input voltage applied thereto, means indicating said output voltage, and means selectively coupling said squaring circuit to said tuned circuits.

9. In apparatus for measuring the temperature of a fluid, a container, an ionized fluid in said container, an inductance coil encircling said container, a tuned circuit including said coil as one element thereof, a second tuned circuit having an adjustable resistance for varying the "Q" of said circuits, and an inductance coil, a container for a reference fluid encircled by said second coil, means for supplying an oscillatory voltage to said circuits, a circuit for producing an output voltage which varies as the square of the input voltage applied thereto, means indicating said output voltage, and means selectively coupling said squaring circuit to said tuned circuits.

10. In apparatus for measuring the temperature of a fluid, a container, an ionized fluid in said container, an inductance coil encircling said container, a tuned circuit including said inductance coil, a fixed resistance connected in series with said coil, and a condenser connected in parallel with the coil-resistance unit, a second tuned circuit including a coil, an adjustable resistance and a fixed resistance connected in series therewith, and a condenser connected in parallel with the condenser-resistance combination, a two gang switch, an oscillator connectible through one gang of said switch so as to apply an oscillatory voltage across the fixed resistance of one tuned circuit with the switch in a first position and to apply said oscillatory voltage across the fixed resistance of the other tuned circuit with the switch in a second position, an amplifier having an input circuit and an output circuit, said input circuit being connected through the other gang of said switch across the condenser of said one tuned circuit with the switch in said first position and being connected across the condenser of said other tuned circuit with the switch in said second position, a squaring circuit coupled to the output circuit of said amplifier, said squaring circuit producing an output voltage which varies as the square of the input voltage, and means indicating the output voltage of said squaring circuit.

11. In apparatus for measuring the temperature of a fluid, a container, an ionized fluid in said container, an inductance coil encircling said container, a condenser connected in parallel with said coil to form a tuned circuit, a second tuned circuit including a coil, an adjustable resistance connected in series therewith, and a condenser connected in parallel with the coil-resistance combination, the "Q" of said first mentioned tuned circuit being equal to the "Q" of said second tuned circuit with the result that the ratio of the squares of the voltages appearing across said tuned circuits is equal to the ratio of the thermal noise voltages in the respective coils, the thermal noise voltage of said inductance coil being representative of the ionization of fluid encompassed thereby, a unit including an oscillator and a potential measuring device, and means for selectively connecting said unit to said tuned circuits.

12. In apparatus for measuring the temperature of a fluid, a container, an ionized fluid in said container, an inductance coil encircling said container, a tuned circuit including said coil as one element thereof, a second tuned circuit having an adjustable resistance, means for supplying an oscillatory voltage to said circuits, a circuit for producing an output voltage which varies as to the square of the input voltage applied thereto, means indicating said output voltage, and means selectively-coupling said squaring circuit to said tuned circuits, the "Q" of said first mentioned tuned circuit being equal to the "Q" of said second tuned circuit with the result that the ratio of the squares of the voltages appearing across said tuned circuits is equal to the ratio of the thermal noise voltages in the respective coils, the thermal noise voltage of said inductance coil being representative of the ionization of fluid encompassed thereby.

References Cited in the file of this patent

UNITED STATES PATENTS

| | | |
|---|---|---|
| 1,610,971 | Ruben | Dec. 14, 1926 |
| 2,482,773 | Hieronymus | Sept. 27, 1949 |
| 2,485,931 | Slonczewski | Oct. 25, 1949 |
| 2,572,908 | Brenholdt | Oct. 30, 1951 |
| 2,587,631 | Kuehne | Mar. 4, 1952 |

OTHER REFERENCES

Review of Scientific Instruments, May 1949, volume 20, No. 5, pages 349–352, Article by Calcote.